United States Patent [19]

Hase et al.

[11] Patent Number: 4,721,318
[45] Date of Patent: Jan. 26, 1988

[54] STEERING SYSTEM FOR AN AUTOMOTIVE VEHICLE

[75] Inventors: Makoto Hase, Hamamatsu; Akihiko Kaneko, Kosai, both of Japan

[73] Assignee: Suzuki Motor Company Limited, Shizuoka, Japan

[21] Appl. No.: 846,194

[22] Filed: Mar. 31, 1986

[30] Foreign Application Priority Data

Apr. 8, 1985 [JP] Japan .................................. 60-72765
Oct. 25, 1985 [JP] Japan .................................. 60-239081

[51] Int. Cl.[4] .............................................. B62D 7/14
[52] U.S. Cl. ...................................... 280/91; 180/140
[58] Field of Search ....................... 280/91, 98, 96, 99, 280/103; 180/140; 74/28

[56] References Cited

U.S. PATENT DOCUMENTS

| | | | |
|---|---|---|---|
| 2,812,191 | 11/1957 | Kersey, Jr. et al. | 280/91 |
| 3,255,840 | 6/1966 | Tangen | 280/91 |
| 3,596,730 | 8/1971 | Cecce | 280/91 |
| 3,913,936 | 10/1975 | Thomas | 280/91 |
| 3,977,693 | 8/1976 | Gamaunt | 280/91 |
| 4,105,086 | 8/1978 | Ishii et al. | 280/91 |
| 4,592,561 | 6/1986 | Furukawa | 280/91 |

FOREIGN PATENT DOCUMENTS

| | | |
|---|---|---|
| 55-91458 | 7/1962 | Japan . |
| 55-99471 | 7/1962 | Japan . |
| 56-5270 | 7/1962 | Japan . |
| 56-163969 | 7/1962 | Japan . |
| 58-170671 | 7/1962 | Japan . |
| 59-96061 | 7/1962 | Japan . |
| 684380 | 12/1952 | United Kingdom . |

*Primary Examiner*—Richard A. Bertsch
*Attorney, Agent, or Firm*—Birch, Stewart, Kolasch & Birch

[57] ABSTRACT

An improved steering system for a small-sized lightweight wheeled vehicle, such as an all-terrain vehicle being equipped with balloon tires, which comprises independent steering mechanisms adapted respectively to the steering operation of the front and rear wheels of the vehicle. This steering system comprises a single or a plurality of steering arms mounted integrally on a steering shaft, a pair of tie rods for the front wheels and a linkage rod for the rear wheels being connected pivotally to the steering arm or arms, linkage lever sleeves mounted rotatably about a linkage shaft provided on a frame structure of the vehicle, the linkage lever sleeve having a linkage arm secured respectively at its opposite inboard and outboard ends with respect to a frame structure of the vehicle, the linkage rod being connected pivotally to the linkage arm on the inboard end of the linkage lever sleeves, and a pair of tie rods extending rearwardly and in a generally parallel relationship with each other for connecting pivotally a pair of rear wheels and being connected pivotally to the linkage arm on the outerboard ends of the linkage lever sleeves, the linkage arm being disposed with a substantial distance therebetween on the inboard and outboard ends of the linkage lever sleeve so as to define a substantial spacing for accommodating an engine between the tie rods for the pair of rear wheels extending on the outboard of the frame structure. Also, a switching means is provided for shifting the steering system between an engagement state and a disengagement state of the steering shaft with the rear wheel steering mechanism, so as to allow the switching between a four-wheel steering position and a front wheel steering position.

18 Claims, 11 Drawing Figures

STEERING SYSTEM FOR AN AUTOMOTIVE VEHICLE

BACKGROUND OF THE INVENTION (i) Field of the Invention

The present invention relates to a steering system for use in an automotive vehicle, and more particularly to a steering system which is particularly suitable for a small-sized light wheeled vehicle, such as an all-terrain vehicle being equipped with balloon tires.

(ii) Description of the Prior Art

In the design of a light-weight wheeled vehicle which is specifically designed to run on the wild or irregular grounds, it is generally required that a vehicle can be operated with a sharp steering performance that provides a small-radius of turning, and in a certain severer application, it is sometimes required to provide a vehicle for such off-road services with a four-wheel-steering system, or a steering system for both the front and rear wheels of a vehicle. In such a specific design of steering, the size of this type vehicle is generally to be substantially small, and therefore, resulting in a substantially large ratio of weight of an engine to that of the vehicle. In consideration of this fact, however, it is a very difficult in practice to provide such a four-wheel steering system because of the practical restrictions in dimensions or layout of the chasis of a vehicle. Therefore, to the best knowledge of the Applicant, there has been put in use no off-road vehicles equipped with this four-wheel steering system.

The present invention is essentially directed to the provision of an efficient resolution to such inconveniences and difficulties in practice as outlined above and expeienced in the conventional steering system layout designs.

SUMMARY OF THE INVENTION (1) It is therefore a primary object of the present invention to provide a useful and unique four-wheel steering system which can be installed free from any layout restrictions in an off-road automotive vehicle for wild field services in which the ratio of weight of an engine to the overall weight of the vehicle is substantially large.

According to one aspect of the invention, this four-wheel steering system can be incorporated without any practical problems in the installation of an engine in such a light-weight wheeled vehicle, which can meet any restrictions in the layout of the engine.

(2) It is another object of the invention to provide a unique four-wheel steering shifting system adapted for a four-wheel steerable vehicle which can be shifted between a four-wheel (the front and rear wheels) steering (4WS) position and a front-wheel steering (2WS) position, whereby an optimal driving performance can be attained according to any operating conditions.

According to another aspect of the invention, there is attainable an optimal steering performance of a vehicle by selectively shifting between the four-wheel steering position and the two-wheel steering position in accordance with a current operating condition, as the case may be, whereby a sharp or positive steering operation can be assured at a slow speed operation by selecting the four-wheel steering position, while a stable maneuverability can be attained at a high speed operation by selecting the ordinary front-wheel steering position.

Additional features and advantages of the invention will now become more apparent to those skilled in the art upon consideration of the following detailed description of a preferred embodiment exemplifying the best mode of carrying out the invention as presently perceived. The detailed description refers particularly to the accompanying drawings, in which like parts are designated at like reference numerals.

DETAILED DESCRIPTION OF THE INVENTION

The present invention will now be described in detail by way of example with, but not restricted in any way to, preferred embodiments thereof in conjunction with the accompanying drawings, as follows.

Figure 1:
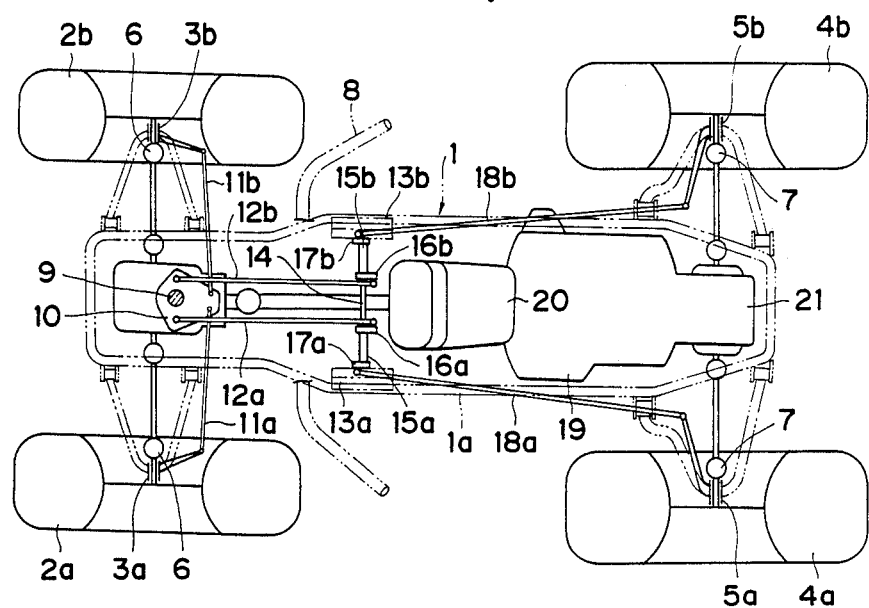
FIG. 1 is a general plan view showing the general structure of a light weight off-road wheeled vehicle by way of a preferred embodiment of the present invention.
Figure 2:
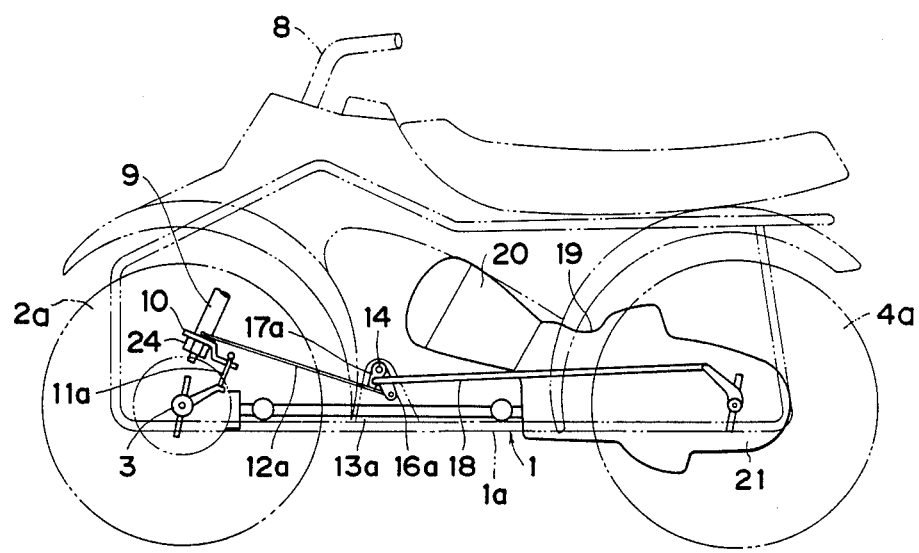
FIG. 2 is a general side elevational view showing the embodiment of the vehicle shown in FIG. 1.

Referring firstly to FIGS. 1 and 2, there is schematically shown the typical construction of an light-weight off-road wheeled vehicle of saddle riding type which is serviceable for operation on rough and wild grounds. In general, this type vehicle has a chasis or main frame construction 1 which is formed with curved pipes, and has front axles 3a, 3b for front wheels 2a, 2b in the front portion of the frame construction, and rear axles 5a, 5b for rear wheels 4a, 4b in the rear portion of the frame, both axles being mounted swingably in steering motion about the axes of front and rear king pins 6 and 7, respectively.

There is provided a steering shaft 9 extending in inclined fashion at a certain angle of inclination, which is rotatable by a handle bar 8 mounted at its top end and operable for steering motion by a driver of the vehicle, and which is mounted rotatably by a bearing 24 at its lower end.

Also, at the lower end of the steering shaft 9, there is connected fixedly a steering arm 10 which is formed with a stepped-down tab portion which is visible from the lateral side in the side elevational view of FIG. 2, and to this tab portion there are connected pivotally a pair of tie rods 11a, 11b for the steering motion of the front wheels 2a, 2b, and to the web portion of this steering arm 10 there is connected pivotally a pair of linkage rods 12a, 12b for the steering motion of the rear wheels 4a, 4b, respectively.

Figure 4:
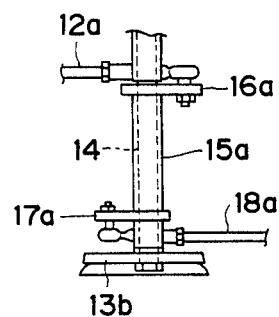
FIG. 4 is an enlarged fragmentary view showing in detail the construction of a steering linkage arrangement of the invention.
Figure 5:
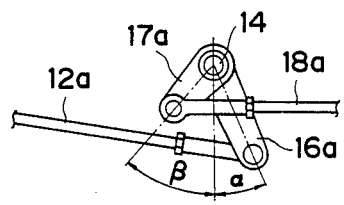
FIG. 5 is an enlarged fragmentary side view showing the same arrangement shown in FIG. 4.

There is mounted an elongated linkage shaft 14 extending across brackets 13a, 13b, which are mounted securely upon the frame structure 1, and upon the lateral sides of which shaft there are mounted rotatably a pair of linkage lever sleeves 15a, 15b. Referring more specifically to FIGS. 4 and 5, there are provided linkage arms 16a and 16b on the inner ends of the linkage lever sleeves 15a, 15b, and there are also provided linkage arms 17a and 17b on outer ends of the linkage lever sleeves 15a, 15b, respectively. Upon these the linkage arms 16a, 16b, there are connected pivotally the trailing ends of the linkage rods 12a, 12b for steering the rear wheels, and upon the linkage arms 17a, 17b, there are similarly connected pivotally the leading ends of tie rods 18a, 18b for the steering motion of the rear wheels, respectively. These tie rods 18a, 18b extend generally in the longitudinal direction and generally along and above a side frame 1a, which is a longitudinal part of the main frame structure 1 extending on both lateral sides of the vehicle, thus leaving a substantial space in the central portion of the vehicle's frame structure as defined surroundedly by the tie rods 18a, 18b and the linkage shaft 14, so that an internal combustion engine 19 may be accommodated upon the main frame structure 1. Incidentally, in FIGS. 1 and 2, there are shown provided a cylinder portion 20 of the engine 19 and a differential gear casing 21 formed as an extension of the engine's transmission, respectively.

According to this particular embodiment, as typically seen in FIG. 5, the linkage arms 16a mounted on the inner end of the linkage lever sleeves 15a is set at an angle α off the vertical line passing the center of the linkage shaft 14 towards the rear direction of the vehicle, while the linkage arms 17a on the outer end of the linkage lever sleeves 15a is set at an angle β off the vertical line mentioned above towards the front direction of the vehicle, these linkage arms 16a, 17a being mounted in a mirror image relationship with the other set of linkage arms 16b, 17b of the opposite arrangement with respect to the center line of the vehicle's frame construction.

Figure 6:
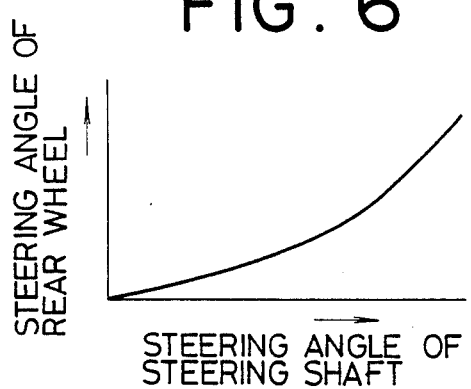
FIG. 6 is a graphic representation showing the relationship between the steering angle of the steering shaft and the rear wheel steering angle.

Now, by virtue of such arrangement of these steering linkage arrangement as noted above, it is advantageous that the characteristics of the steering motion of the rear wheel may be set at option with respect to a current angle of steering on the steering shaft 9 as typically shown in FIG. 6. More specifically, such a specific steering characteristic can be established as appreciated from FIG. 6 that there is effected a relatively small rear steering angle with a small steering angle on the steering shaft 9, while there is effected a non-linear increment in the rear steering angle with a maximum extent of steering on the steering shaft, so that there can be attained a sharp cornering performance of the vehicle.

Next, reference is made in detail to this unique steering operation of the steering system for the off-road vehicle according to the present invention in conjunction with FIG. 3, as follows.

Figure 3:
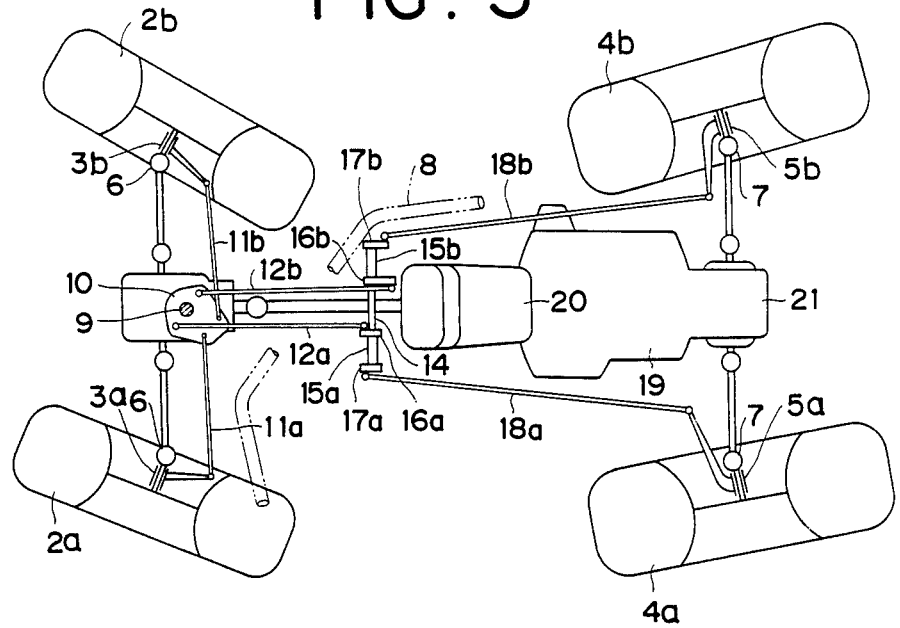
FIG. 3 is a plan view showing a typical operation for turning to the right of the vehicle by function of the steering system of the invention.

In cornering operation, when the handle bar 8 is turned to effect a right turning motion by a driver of the vehicle, as typically shown in FIG. 3, it is seen that the steering arm 10 is caused to be rotated in the clockwise direction about the axis of the steering shaft 9, so that the linkage rod 12b for steering the right rear wheel may be pushed towards the rearward direction as viewed in FIG. 3 and that the linkage rod 12a for steering the left rear wheel may be pulled towards the forward direction, respectively. With such linkage motions, the linkage lever sleeves 15a, 15b on the both sides of the linkage shaft 14 are caused to be rotated in the opposite directions with each other through the linkage arms 16a, 16b, so that the tie rod 18b for steering the right rear wheel as viewed in FIG. 3 may be pushed towards the rearward direction and that the tie rod 18a for steering the left rear wheel may be pulled in the forward direction, respectively. With this steering motion in the entire steering linkage system, it is seen that the front wheels 2a, 2b are caused to swing to the right, and the rear wheels 4a, 4b are caused to swing to the left in their respective steering motions.

Then, when turning the vehicle to the left with the bar handle 8 being turned in the counter-clockwise direction, each of the members involved in the steering system may be caused to move in the opposite directions to the right-hand turning operation of the vehicle, so that there is effected a motion of the vehicle to the left, accordingly.

Figure 7:
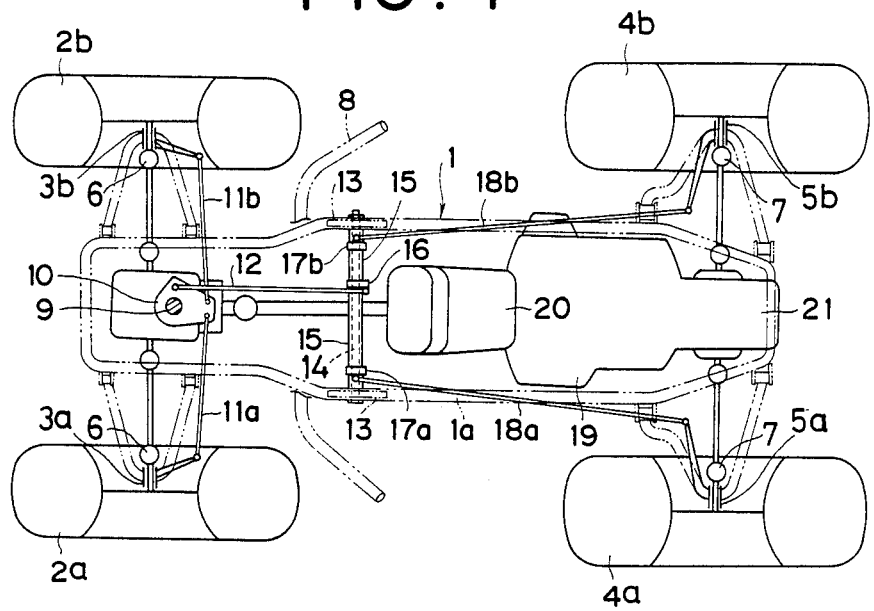
FIG. 7 is a general plan view showing the general construction of an off-road wheeled vehicle by way of a second embodiment of the invention.

Now, referring to FIG. 7, which shows a second embodiment of the present invention, there is provided a single steering linkage rod 12 for the steering motion of the front wheels 2, wherein the trailing end of the linkage rod 12 is connected pivotally to a steering linkage arm 16 mounted on a single linkage lever sleeve 15 in such a manner that the push-pull motions of the linkage rod 12 as generated from the rotating motion of the steering shaft 9 may be relayed operatively to the pair of tie rods 18a, 18b for steering the rear wheel pair. For the following steering linkage arrangement for the rear wheels 4 is similar in construction to the embodiment shown in FIGS. 1 and 2 except for the provision of the linkage arms 17a, 17b mounted on the opposite ends of the single elongate linkage lever sleeve 15 for producing the steering motions for the rear wheels, which generates the same steering motions of the tie rods 18a, 18b for the rear wheels 4 as in the previous embodiment shown in FIGS. 1 and 2. With this arrangement, there is attainable such an advantageous effect that the construction of the front steering linkage mechanism may be made simpler substantially with less members such as a bearing and linkages required, thus contributing to a substantial reduction in the production cost of the entire steering system. Other linkage mechanism is identical with the embodiment shown in FIG. 1, therefore, a further detailed explanation is unnecessary for clarity.

Now, according to the advantageous construction of the invention as practiced by way of the first and second embodiments thereof as noted hereinbefore, wherein there are provided the steering arm 10, connected integrally connected to the steering shaft 9 of the vehicle, the pair of tie rods 11a, 11b for steering the front wheels and the pair of linkage rods 12a, 12b for steering the rear wheels connected pivotally to the steering arm 10, respectively, the linkage arms 16a, 16b fixed on the opposite ends of the linkage lever sleeves 15a, 15b, which are mounted rotatably on the linkage shaft 14, the linkage shaft 14 being journalled pivotally on the frame structure 1 of the vehicle, the opposite ends of the linkage rods 12a, 12b being connected pivotally to the linkage arms 16a, 16b, respectively, and the linkage arms 17a, 17b mounted at the substantial distance across the opposite outer ends of the linkage lever sleeves 15a, 15b, the tie rods 18a, 18b being connected pivotally to the opposed linkage arms 17a, 17b disposed at the substantial distance therebetween widthwise of the vehicle, so that there is attained the substantial spacing between the extensions of the opposite tie rods 18a, 18b alongside the side frame structure of the vehicle, in which spacing there is accommodated the engine 19, thus making it feasible to provide the steering linkage system for the both front and rear wheels of the vehicle without any interference with the installation of the engine even in this frame structure for a small-sized light-weight vehicle, and thus meeting the dimensional and hence layout restrictions in the frame structure for such a vehicle, accordingly. In addition, there is attained an additional effect such that a sharp cornering performance of the vehicle can be ensured at a maximum steering angle to be taken during a relatively low speed operation of the vehicle, by the provision of an appropriate difference in the steering phases between the front and rear wheels, thereby effecting the non-linear steering characteristics in the rear wheel steering operation, while maintaining a small steering angle of the rear wheels with a relatively small angle of steering given on the handle bar as taken at a relatively high speed operation of the vehicle. Furthermore, there is attained another advantage with the mounting of the tie rods 18a, 18b higher than the side frame 1a extending laterally outwardly from the main frame structure 1 of the vehicle, as typically shown in FIG. 2, in that these tie rods 18a, 18b of the steering system may be well protected from any possible damages during the operation on rough and wild terrains.

By the way, while it is arranged in the first and second embodiments of the invention such that there is provided the steering arm 10 fixedly mounted on the steering shaft 9, to which steering arm 10 the tie rods 11a, 11b for steering the front wheel pair and the linkage rods 12a, 12b for steering the rear wheel pair are operatively connected, respectively, it is of course possible in practice to provide, for example, two pieces of steering arms mounted fixedly on the steering shaft 9 for the operative connection in such a manner that the tie rods 11a, 11b for steering the front wheel pair are connected operatively to one of these arms, while the linkage rods 12a, 12b are connected operatively to the other, respectively.

There is shown a third embodiment of the invention in FIGS. 8 through 11, in which like parts as appeared in FIGS. 1 and 2 are designated at like reference numerals, and any further explanation is omitted for the sake of clarity.

Figure 8:
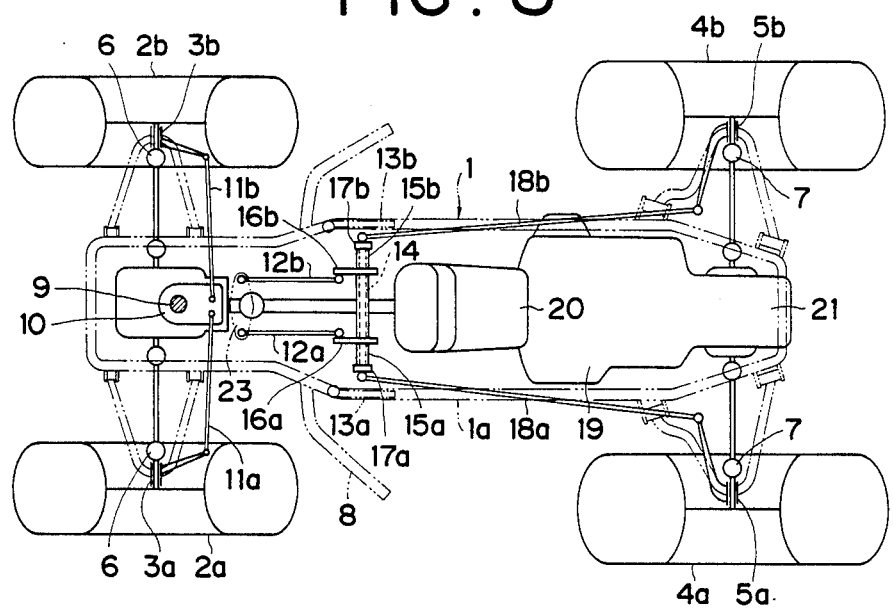
FIG. 8 is a general plan view showing the general construction of an off-road wheeled vehicle by way of a third embodiment of the invention.
Figure 9:
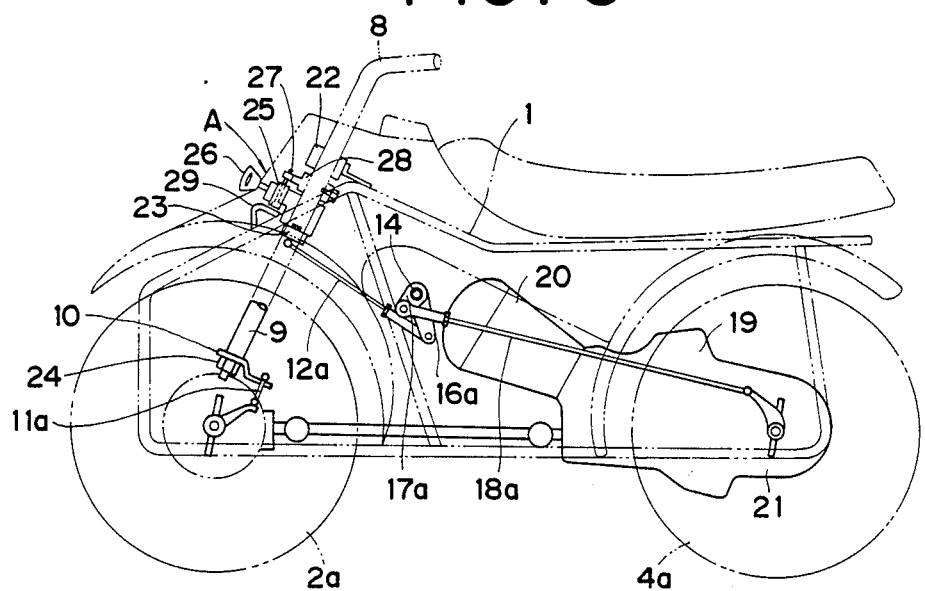
FIG. 9 is a side elevational view showing the same embodiment shown in FIG. 8.
Figure 11:
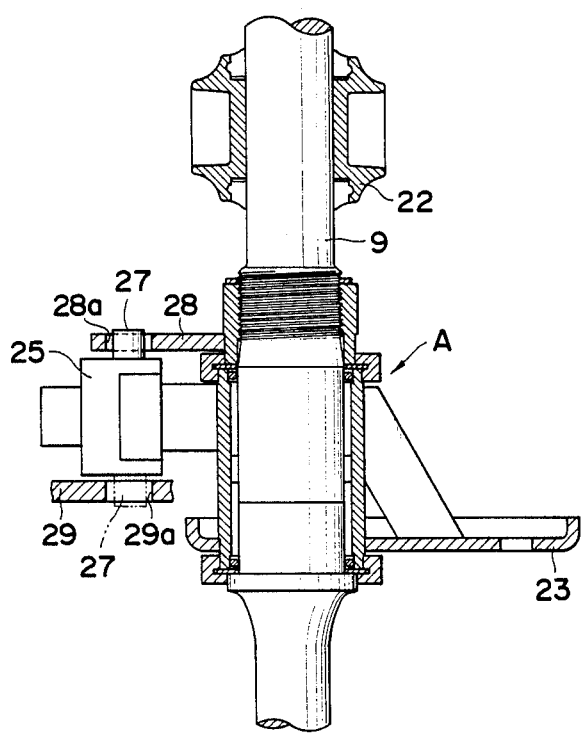
FIG. 11 is an enlarged fragmentary view showing in detail the arrangement of a steering shaft and a lock mechanism of the invention.

According to this embodiment, as typically shown in FIGS. 9 and 11, there is shown provided a rear wheel steering lock assembly A comprising a rear wheel steering arm 23 and a lock mechanism 25 also serving as a steering shift means, both of which are assembled integrally with each other. This assembly A is mounted rotatably on the steering shaft 9 at or near a lower position than a shaft bearing provided for supporting rotatably the steering shaft 9 of the vehicle. Referring more specifically to FIGS. 8 and 9, there are connected pivotally the linkage rods 12a, 12b for steering the pair of rear wheels 4a, 4b. On the other hand, only the tie rods 11a, 11b for steering the front wheel pair are connected pivotally to the steering arm 10.

With this arrangement, therefore, there is provided a front wheel steering mechanism comprising the steering shaft 9, the steering arm 10 which is mounted integrally to this steering shaft 9, and the pair of tie rods 11a, 11b for steering the front wheel pair. On the other hand, there is provided a rear wheel steering mechanism which comprises the rear wheel steering arm 23 mounted rotatably on the steering shaft 9, the pair of linkage rods 12a, 12b connected operatively to this rear wheel steering arm 23, the pair of linkage lever sleeves 15a, 15b connected respectively to these linkage rods 12a, 12b, and the pair of tie rods 18a, 18b for steering the rear wheel pair connected respectively to these linkage lever sleeves 15a, 15b.

The lock mechanism 25 which is mounted rotatably on the steering shaft 9 together with the rear wheel steering arm 23 is adapted to switch the linkage for the rear wheel steering by using an ignition key 26 designed to be inserted into a keyhole for specifically switching the steering operation. When the ignition key 26 is rotated once upon its insertion into the keyhole and then withdrawn therefrom, a lock pin 27 provided in the keyhole is caused to engage with its locking position by shifting in the vertical directions, either upwardly or downwardly, as viewed in FIGS. 9 and 11 for a positive locking function.

Referring to FIG. 11, there are shown provided a pair of engagement brackets 28, 29 having respective engaging holes 28a, 29a therein corresponding in location to the lock mechanism 25. More specifically, one bracket 28 is mounted securely on the steering shaft 9 immediately above the lock mechanism 25 in a cooperative relationship with each other, and the other bracket 29 is fiex on the part of the frame structure 1 of the vehicle below the lock mechanism 25.

With this arrangement of locking mechanism for an offroad vehicle according to the invention, it is possible to selectively shift between the four-wheel steering (4WS) position and the front wheel steering (2WS) position, as necessary depending upon the operating condition encountered.

Referring firstly to the four-wheel steering operation, the ignition key 26 is used to switch the lock mechanism 25 into the position where the lock pin 27 is shifted into the upper position as shown by a solid line in FIG. 11 so as to have the lock pin 27 engaged with the engaging hole 28a formed in the bracket 28. In this position, the lower end of the lock pin 27 is shifted out of engagement with the engaging hole 29a in the bracket 29. By this engagement of the lock pin 27 with the engaging hole 28a, the steering shaft 9 and the rear wheel steering arm 23 are connected with each other so that the rotating or steering motions of the steering shaft 9 may be relayed straightforwardly to the rear wheel steering arm 23.

Figure 10:
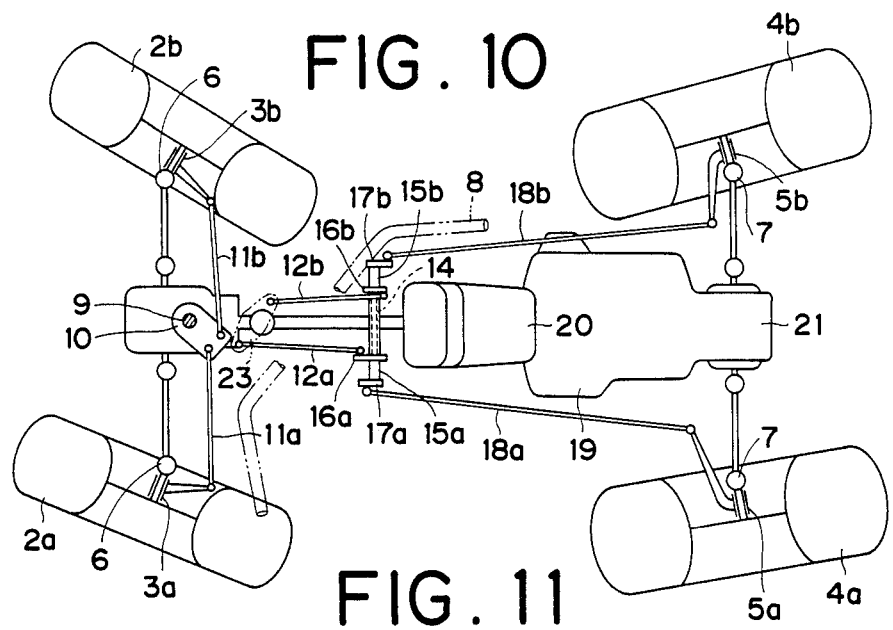
FIG. 10 is a plan view showing a typical operation for turning to the right in the vehicle shown in FIG. 9.

Now, when the 8 is turned for a right turning motion of the vehicle, the steering arm 10 is caused to swing in the clockwise direction about the axis of the steering shaft 9 as viewed in FIG. 10, with the linkage rod 12b for steering the right rear wheel being pushed rearwardly and with the linkage rod 12a for steering the left rear wheel pulled forwardly, respectively. With this motion, the linkage lever sleeves 15a, 15b on the opposite ends of the linkage shaft 14 are caused to rotate in the relatively opposite directions with each other by way of the linkage arms 16a, 16b, which causes the tie rod 18b for steering the right rear wheel to be pushed rearwardly and the tie rod 18a for steering the left rear wheel to be pulled forwardly, relative. With such relatively motions of the tie rods 18a, 18b, the front wheels 2a, 2b are then turned to the right, while the rear wheels 4a, 4b are turned to the left, thus resulting in a right-turning operation of the vehicle.

When turning to the left with the handle bar 8 being moved to a left-turning position, each of these members in the steering linkage mechanism is now caused to be moved in the opposite directions to the right-turning operation, thus bringing a left-turning operation of the vehicle, accordingly.

Next, referring to the steering operation in the front wheel steering position, the ignition key 26 is now used to switch the lock mechanism 25 into a position where the lock pin 27 is caused to be lowered so as to come out of engagement with the engaging hole 28a in the upper bracket 28 as shown by a virtual line in FIG. 11, while on the opposite side the pin 27 is put into engagement with the engaging hole 29a in the lower bracket 29. When the rear wheel steering lock assembly A is in this engaging position, the lock mechanism 25 and the rear wheel steering arm 23 are fixed to the frame structure 1 through the bracket 29, while the steering shaft 9 is now disconnected in a position to be rotatable with respect to the lock mechanism 25 and the rear wheel steering arm 23. In this position, the rotating motion of the steering shaft 9 is then relayed only to the steering arm 10 for steering the front wheels, while the rear wheel steering arm 23 is left not receiving this rotating motion of the steering shaft 9. As a consequence, when the 8 is operated by the driver, only the front wheels 2a, 2b are caused to be turned in steering motions, while leaving the rear wheels 4a, 4b disconnected from any steering motions.

By virtue of such advantageous construction of the steering system for a light-weight vehicle for the rough terrain services according to the present invention as noted hereinbefore, in an operating condition that a small sharp turning operation is required at a relatively low running speed, a due turning performance can be attained, if the lock mechanism 25 is switched by the ignition key 26 into the four-wheel steering position prior to the start-up. On the other hand, in view of the possibility that the stability in the steering operation of a vehicle may be affected adversely, if the vehicle is in the four-wheel steering position in a high-speed operation, it is advisable that the lock mechanism 25 is switched to the ordinary front-wheel steering position.

In this embodiment of the invention, the ignition key 26 is used as a switching means for the lock mechanism 25, which may also serve an advantageous effect such that there is no chance of inadvertently switching the lock mechanism 25 to an improper steering position once a certain steering position is selected, since the ignition key 26 for switching the lock mechanism cannot be taken out of the engine ignition keyhole during the operation of the vehicle.

While the invention was explained by way of the specific embodiments thereof noted above, it will be apparent to those skilled in the art that the invention is not restricted to such embodiments in any ways, but many other modifications may be made within the scope and spirit of the invention.

As for an example, while the unique and useful construction of the four-wheel steering system is described concerning with the particular adaptation to a light-weight rough terrain vehicle, the present invention can naturally be adapted to any other types of vehicles than the particular type for the rough and wild field use as noted hereinbefore. Also, the lock mechanism 25 and its related components may be changed in various ways. Any other switching means for the lock mechanism 25 can of course be employed than the common of the ignition key 26.

With the adoption of the advantageous construction of the steering system for a wheeled vehicle according to the present invention, wherein the steering position can be shifted selectively between the four-wheel steering position which allows the both front and rear wheels to be steered concurrently and the two-wheel steering position which allows only the front wheel to be steered, it is possible in practice to select a proper steering position from these two in accordance with a current operating condition as the vehicle may encounter during the operation on the rough terrains. More specifically, there is attainable an optimal steering performance of a vehicle by selectively shifting between the four-wheel steering position and the two-wheel steering position in accordance with a current operating condition, as the case may be, whereby a sharp or positive turning operation can be assured for the running operation at a relatively slow speed by selecting the four-wheel steering position, while a stable maneuverability can be attained in a relatively high speed operation by selecting the ordinary front-wheel steering position.

While the present invention has been described in detail by way of specific preferred embodiments thereof, it is to be understood that the present invention is not intended to be restricted to the details of the specific construction of the entire system and the arrangement of components shown in the preferred embodiments, but to the contrary, the present invention can of course be practiced in many other arrangement to an equal advantageous effect in accordance with the foregoing teachings without any restriction thereto and without departing from the spirit and scope of the invention.

It is also to be understood that the appended claims are intended to cover all of such generic and specific features particular to the invention as disclosed herein and all statements relating to the scope of the invention, which as a matter of language might be said to fall thereunder.

What is claimed is:

1. A steering system for use in a vehicle which comprises, in combination, a steering shaft means, a steering arm means mounted integrally with said steering shaft means, a pair of tie rod means for steering a pair of front wheels connected pivotally at their one end to said steering arm means, a linkage rod means for steering a pair of rear wheels connected pivotally at their one end to said steering arm means, linkage lever means mounted rotatably about a linkage shaft means provided on a frame structure of the vehicle said frame structure including side frames, said linkage rod means being connected pivotally to linkage arm means on the inner ends of said linkage lever means, a pair of tie rod means for steering a pair of rear wheels connected pivotally to linkage arm means on the outer ends of said linkage lever means, wherein an engine is disposed between said pair of tie rod means for steering a pair of rear wheels, and said pair of tie rod means for steering the pair of rear wheels are disposed extending generally above and in a parallel relationship with respect to said side frames of said frame structure of the vehicle.

2. A steering system for use in a vehicle as claimed in claim 1, wherein said linkage rod means for steering the pair of rear wheels comprises a pair of linkage rods, and said linkage lever means comprises a pair of linkage lever sleeves.

3. A steering system for use in a vehicle as claimed in claim 2, wherein said pair of tie rod means for steering the pair of rear wheels are disposed extending generally above and in a parallel relationship with respect to the outer boards of said frame structure of the vehicle.

4. A steering system for use in a vehicle as claimed in claim 2, wherein said linkage arm means mounted on the inner end of said linkage lever means is set at an angel $\alpha$ off the vertical line passing the center of said linkage shaft means towards the rear direction of the vehicle, while said linkage arm means on the outer end of said linkage means is set at an angle $\beta$ off said vertical line towards the front direction of the vehicle, said linkage arm means being mounted in a mirror image relationship with the other set of said linkage arm means of the opposite arrangement with respect to the center line of said frame structure of the vehicle.

5. A steering system for use in a vehicle as claimed in claim 2, wherein said vehicle is an all-terrain vehicle.

6. A steering system for use in a vehicle as claimed in claim 1, wherein said linkage rod means comprises a single linkage rod, and wherein said linkage rod means is connected pivotally at its trailing end to the single linkage lever means disposed on an outboard end of said linkage lever sleeve means.

7. A steering system for use in a vehicle as claimed in claim 6, wherein said pair of tie rod means for steering the pair of rear wheels are disposed extending generally above and in a parallel relationship with respect to the outer boards of said frame structure of the vehicle.

8. A steering system for use in a vehicle as claimed in claim 6, wherein said linkage arm means mounted on the inner end of said linkage lever means is set at an angle $\alpha$ off the vertical line passing the center of said linkage shaft means towards the rear direction of the vehicle, while said linkage arm means on the outer end of said linkage lever means is set at an angle $\beta$ off said vertical line towards the front direction of the vehicle, said linkage arm means being mounted in a mirror image relationship with the other set of said linkage arm means of the opposite arrangement with respect to the center line of said frame structure of the vehicle.

9. A steering system for use in a vehicle as claimed in claim 1, wherein said linkage arm means mounted on the inner end of said linkage lever means is set at an angle $\alpha$ off the vertical line passing the center of said linkage shaft means towards the rear direction of the vehicle, while said linkage arm means on the outer end of said linkage lever means is set at an angle $\beta$ off said vertical line towards the front direction of the vehicle, said linkage arm means being mounted in a mirror image relationship with the other set of said linkage arm means of the opposite arrangement with respect to the center line of said frame structure of the vehicle.

10. A steering system for use in a vehicle as claimed in claim 1, wherein said vehicle is an all-terrain vehicle.

11. A steering system for use in a vehicle as claimed in claim 1, wherein said linkage arm means mounted on the inner end of said linkage lever means is set at an angle $\alpha$ off the vertical line passing the center of said linkage shaft means towards the rear direction of the vehicle, while said linkage arm means on the outer end of said linkage lever means is set at an angle $\beta$ off said vertical line towards the front direction of the vehicle, said linkage arm means being mounted in a mirror image relationship with the other set of said linkage arm means of the opposite arrangement with respect to the center line of said frame structure of the vehicle.

12. A steering system for use in a vehicle which comprises, in combination, a front wheel steering means and a rear wheel steering means adapted respectively to have a pair of front wheels and a pair of rear wheels steered, corresponding to the steering motion on a steering shaft means, and a switching means adapted to selectively shift between an engagement postion and a disengagement position of said steering shaft means with said rear wheel steering means in such a manner that there may be attained a desired steering operation by shifting between a four (front and rear) wheel steering position and a front-wheel steering position, said switching means comprises a lock mechanism connected rotatably on said steering shaft means.

13. A steering system for use in a vehicle as claimed in claim 12, wherein said front wheel steering means comprises a steering shaft means, a steering arm means mounted integrally with said steering shaft means, and a pair of tie rod means for steering a pair of front wheels connected pivotally to said steering arm means.

14. A steering system for use in a vehicle as claimed in claim 12, wherein said rear wheel steering means comprises a rear wheel steering arm means mounted rotatably on said steering shaft means, a pair of linkage rod means connected pivotally to said rear wheel steering arm means, a linkage lever sleeve means connected pivotally to said linkage rod means and a pair of rear wheel steering tie rod means connected pivotally to said linkage lever sleeve means, respectively.

15. A steering system for use in a vehicle as claimed in claim 12, wherein said lock mechanism is switched by an ignition key.

16. A steering system for use a vehicle as claimed in claim 12, wherein said lock mechanism and said rear wheel steering arm are assembled integrally with each other.

17. A steering system for use a vehicle as claimed in claim 16, wherein an assembly comprising said lock mechanism and said rear wheel steering arm is mounted rotatably on said steering shaft means between the upper and lower bearings of said steering shaft means.

18. A steering system for use a vehicle as claimed in claim 12, wherein said vehicle is an all-terrain vehicle.

* * * * *